United States Patent [19]

Saito et al.

[11] 4,390,979

[45] Jun. 28, 1983

[54] ROTARY RECORDING MEDIUM REPRODUCING APPARATUS HAVING A ROTARY RECORDING MEDIUM CLAMPING DEVICE

[75] Inventors: Takashi Saito, Ayase; Toru Kishi, Zama, both of Japan

[73] Assignee: Victor Company of Japan, Ltd., Yokohama, Japan

[21] Appl. No.: 292,396

[22] Filed: Aug. 13, 1981

[30] Foreign Application Priority Data

Aug. 14, 1980 [JP] Japan .......................... 55/114488[U]

[51] Int. Cl.³ ...................... G11B 19/00; G11B 11/00; G11B 17/00; H04N 5/76
[52] U.S. Cl. ........................................ 369/270; 369/77
[58] Field of Search ................. 369/77, 212, 243, 249, 369/262, 263, 270, 291, 292

[56] References Cited

U.S. PATENT DOCUMENTS 3,871,663 3/1975 Stave .................................... 369/270
4,332,025 5/1982 Thurston ............................. 369/270

FOREIGN PATENT DOCUMENTS 1109400 9/1981 Canada ................................. 369/270
2488764 2/1982 France ................................. 369/270
2074777 11/1981 United Kingdom ................. 369/270

*Primary Examiner*—Steven L. Stephan
*Attorney, Agent, or Firm*—Louis Bernat

[57] ABSTRACT

A rotary recording medium reproducing apparatus comprises a turntable onto which a rotary recording medium is placed, a motor for rotating the turntable, a reproducing transducer for reproducing a recorded signal from the rotary recording medium placed onto the turntable, and a clamping mechanism for clamping the rotary recording medium on the turntable. The clamping device comprises a support structure capable of unitarily rotating with the turntable and moving up and down independently with the turntable, for supporting a part in the vicinity of a center hole of the rotary recording medium when the support structure is in a raised position, an elevating mechanism for moving the support structure upwards and downwards, clamping fingers provided on the support structure for clamping the rotary recording medium on the turntable at a part in the vicinity of the center hole of the rotary recording medium when the clamping fingers are operated, where the clamping fingers are supported at positions deviated from their centers of gravity so as to rotate towards a clamping releasing direction, and a receiving and stopping member for rotating the clamping fingers towards a clamping direction opposite to the clamping releasing direction by receiving and stopping parts of the clamping fingers when the support structure is lowered. The support structure is separated from both the elevating mechanism and the receiving and stopping member when the support structure is lowered. Further, the clamping fingers are applied with a rotational force in the clamping direction due to the weight of the support structure, to press the part of the rotary recording medium in the vicinity of the center hole thereof against the turntable.

10 Claims, 7 Drawing Figures

ROTARY RECORDING MEDIUM REPRODUCING APPARATUS HAVING A ROTARY RECORDING MEDIUM CLAMPING DEVICE

BACKGROUND OF THE INVENTION

The present invention generally relates to rotary recording medium reproducing apparatuses having a rotary recording medium clamping device, and more particularly to a rotary recording medium reproducing apparatus having a device constructed to automatically and stably clamp a rotary recording medium placed onto a turntable at the center part of the rotary recording medium.

Conventionally, apparatuses for reproducing rotary recording mediums of a so-called electrostatic capacitance type have been reduced into practical use. In this reproducing apparatus, a reproducing stylus makes contact with and slides along a recorded track of the rotary recording medium (hereinafter simply referred to as a disc) in which an information signal such as a video signal is recorded as a variation in geometrical configuration, to reproduce the recorded signal as variations in electrostatic capacitance between the disc and an electrode of the reproducing stylus. In this type of a rotary recording medium reproducing apparatus, the disc must be clamped on the turntable so that the disc can rotate with a stable rotating surface upon reproduction, in order ro perform stable reproduction.

A device for clamping a disc on the turntable was previously proposed in a U.S. patent application Ser. No. 249,738 entitled "DISC-SHAPED RECORDING MEDIUM REPRODUCING APPARATUS" filed Mar. 31, 1981, in which the assignee is the same as that of the present application. This disc clamping device rotates unitarily with the turntable, however, moves up and down independently from the turntable. Clamping fingers made of a ferromagnetic material are provided on supporting members which support the part in the vicinity of the center hole of the disc when the clamping device is at a raised position. Further, permanent magnet pieces were provided at corresponding positions where the support members are lowered. The clamping claws are held at non-operational positions by springs, when the support members are at raised positions. On the other hand, the clamping fingers are attracted by the permanent magnet pieces and rotated, when the support members are lowered in a state where the disc is supported by these support members, to clamp the disc onto the turntable. Accordingly, special parts such as the springs and permanent magnet pieces were required, and the construction of the apparatus became complex. Moreover, there was a disadvantage in that the cost of the apparatus became high, due to the troublesome operations involved upon assembling of the apparatus.

SUMMARY OF THE INVENTION

Accordingly, it is a general object of the present invention to provide a novel and useful rotary recording medium reproducing apparatus having a rotary recording medium clamping device, in which the above described disadvantages have been overcome.

Another and more specific object of the present invention is to provide a rotary recording medium reproducing apparatus having a rotary recording medium clamping device, in which a supporting construction having a deviated center of gravity is used for rotating clamping fingers towards clamping releasing directions, so that clamping fingers are locked and rotated towards disc clamping directions when a support mechanism capable of moving up and down is lowered, and the rotational force for rotating the clamping fingers towards disc clamping directions is applied to the clamping fingers due to the own weight of the support mechanism. According to the apparatus of the present invention, the construction of the apparatus can be simplified, since the parts conventionally provided in relation to the clamping fingers such as springs and permanent magnet pieces are not required.

Other objects and further features of the present invention will be apparent from the following detailed description when read in conjunction with the accompanying drawings.

DETAILED DESCRIPTION

Figure 1:
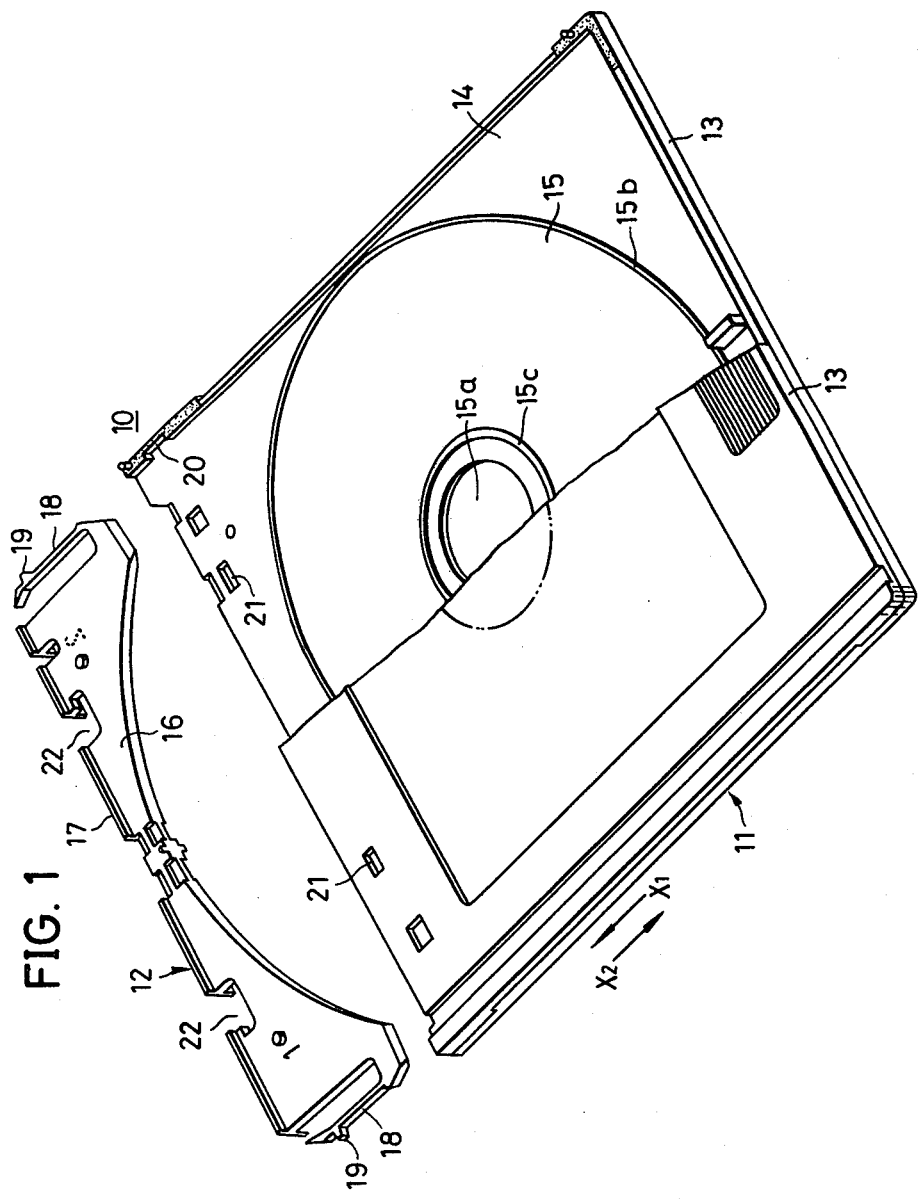
FIG. 1 is a perspective view, with a part cut away, showing an example of a disc case which operates together with a rotary recording medium reproducing apparatus.

In FIG. 1, a disc case 10 comprises a jacket 11 and a lid plate 12. The jacket 11 is assembled from a pair of jacket halves 13 and 13, and comprises a flat cavity or space 14 therein. This space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 engages with the jacket 11.

Figure 2:
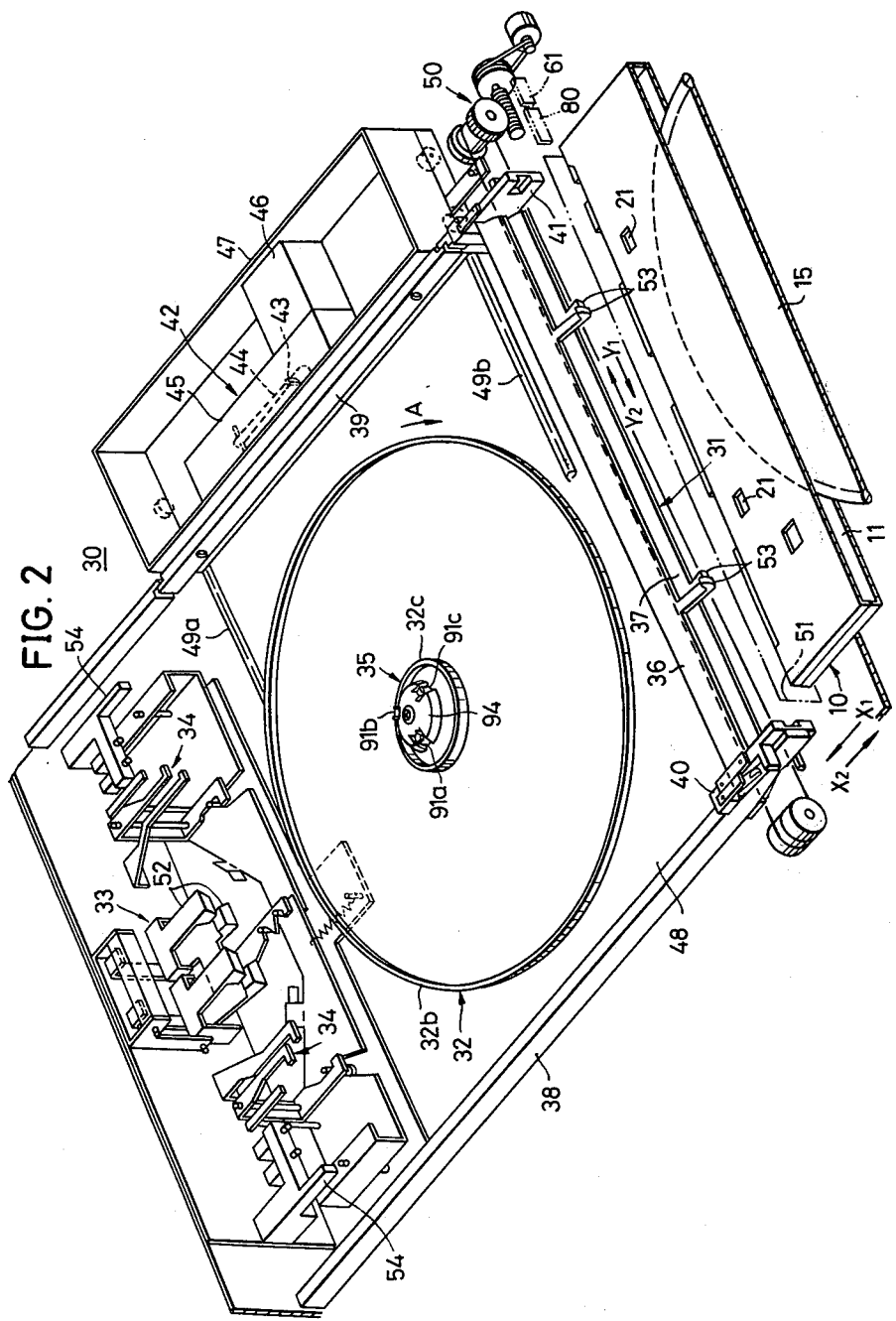
FIG. 2 is a diagram showing an embodiment of a rotary recording medium reproducing apparatus having a rotary recording medium clamping device according to the present invention, with an outer frame disassembled and an elevating mechanism omitted.

As shown in FIG. 2, a reproducing apparatus 30 substantially comprises a jacket opening enlarging mechanism 31, a turntable 32 to rotate the disc 15 positioned thereon, a disc holding mechanism 33 for holding the disc 15, a lid plate locking mechanism 34 for locking the lid plate 12, a disc clamping device 35 for clamping the disc 15 on the turntable 32 which forms an essential part of the apparatus according to the present invention, and the like.

The jacket opening enlarging mechanism 31 comprises upper and lower beams 36 and 37 extending in the directions of the arrows Y1 and Y2, and the supporting members 40 and 41 (sliders) which are respectively fixedly inserted into the guide rails 38 and 39, to support both ends of the respective beams 36 and 37.

A reproducing transducer 42 comprises a pickup device 45 including a cantilever 44 provided with a reproducing stylus 43 a resonator 46 and the like, and is mounted to a carriage 47. The carriage 47 is transferred in the directions of the arrows Y1 and Y2 by means of a transferring mechanism 50, in a state where rollers provided on the carriage 47 roll along rails 49a and 49b respectively provided on a chassis 48.

The disc holding mechanism 33 is provided at the inner part of the reproducing apparatus 30 on the opposite side of an inserting opening 51, and comprises a pair of upper and lower holding fingers 52.

Upon reproduction of the disc 15, the disc case 10 is inserted through the inserting opening 51 of the reproducing apparatus 30, by inserting the disc case 10 with the side of the lid plate 12 into the direction of the arrow X1.

Figure 3:
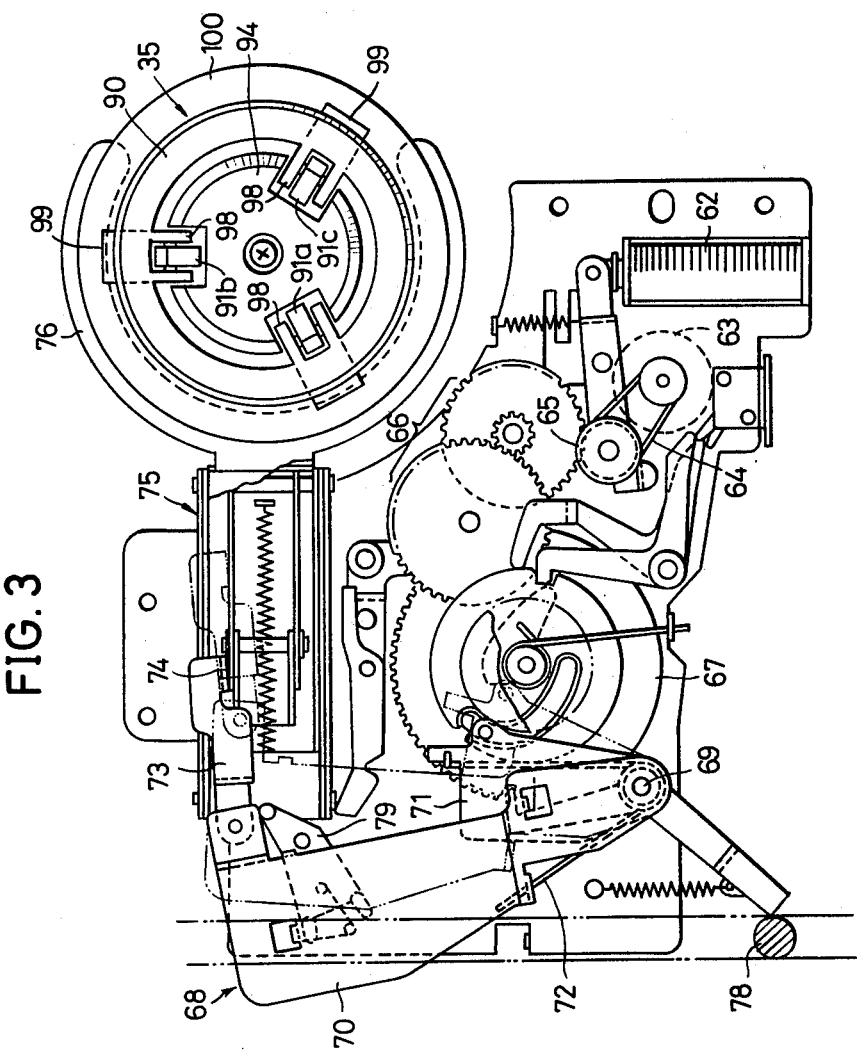
FIG. 3 is a plan view showing an elevator mechanism for a support structure.

Upon insertion of the disc case 10, a load/eject button 60 is pushed. Responsive to this operation, a plunger 62 is energized, and an elevator motor 63 starts to rotate, as shown in FIG. 3. The rotation of the motor 63 is transmitted to a cam-gear structure 67 by way of a belt 64, a gear 65, and reduction gears 66, to rotate the cam-gear structure 67 in a counter clockwise direction unto a position shown in FIG. 3. An elevator lever structure 68 rotates in a counter clockwise direction about a pin 69 from a position indicated by a two-dot chain line to a position indicated by a solid line in FIG. 3, due to the rotation of the above cam-gear structure 67. The elevator lever structure 68 comprises an elevator lever 70 and a control lever 71, and is provided with a torsion spring 72 therebetween.

An L-shaped operating arm 74 connected by a link 73 rotates towards a counter clockwise direction due to the above rotation of the elevator lever structure 68. Accordingly, a so-called pantograph mechanism 75 formed from a pair of arms crossed in a X-shape, changes state from that shown in FIG. 6 to a state shown in FIG. 5. That is, an elevator plate 76 provided on the pantograph mechanism 75 rises, to push and raise a support structure 77.

When the disc case 10 is inserted into the reproducing apparatus 30 in the above described state, the jacket opening enlarging mechanism 31 is pushed and moved in the direction of the arrow X1 by the disc case 10. Thus, the enlarging mechanism 31 moves, the upper and lower beams 36 and 37 rotate, and enlarging fingers 53 thus respectively move in directions to mutually separate from each other. Accordingly, the tip ends of the enlarging fingers 53 engage with engaging windows 21 of the jacket 11, and enlarge the front part of the upper and lower jacket halves 13 upwards and downwards, to enlarge the opening.

Further, when the disc case 10 is inserted into an intermediate position within the reproducing apparatus 30, the elevator lever 70 is pushed by a lower side pin 78 of the slider 40. Hence, the elevator lever 70 is rotated towards a clockwise direction independently with the control lever 71, and is locked at the rotated position by a locking member 79. Therefore, the pantograph mechanism 75 becomes of a state known in FIG. 6 due to the rotation of the elevator lever 70. Moreover, the elevator plate 76 is lowered, and the support structure 77 is similarly lowered to recede from the disc inserting path.

When the disc case 10 is inserted into the innermost part of the reproducing apparatus 30 together with the enlarging mechanism 31 through the upper side of the turntable 32, cutouts 22 of the lid plate 12 is locked by the lid plate locking mechanism 34. Hence, the lid plate 12 is locked and held at the innermost part of the reproducing apparatus 30.

Furthermore, engagement releasing members 54 enter inside the openings on the right and left sides of the disc case 10, and push the sloping surfaces at the tip ends of the engaging arms 18. Accordingly, the engaging arms 18 are respectively distorted inwards, and the projections 19 respectively slip out from the depressions 20, to release the engagement of the lid plate 12 with respect to the jacket 11. Further, the disc 15 is held at a predetermined height by the holding fingers 52.

Next, the jacket 11 is pulled out in the direction of the arrow X2. Since the lid plate 12 and the disc 15 are respectively locked and clamped as described above, only the jacket 11 is moved in the direction of the arrow X2, leaving behind the lid plate 12 and the disc 15. Accompanied by this pulling out of the jacket 11, the lid plate 12 and the disc 15 are relatively pulled out from within the jacket 11. The locking with respect to the elevator lever 70 is released at an intermediate point during the pulling out operation of the jacket 11, and the elevator lever 70 rotates in a counter clockwise direction while the support structure 77 rises. In a state where the jacket 11 is completely pulled out from the reproducing apparatus 30, the disc 15 is supported horizontally at a position directly above the turntable 32 by the holding fingers 52 and the support structure 77 at the raised position.

Then a start button 80 is pushed. Responsive to this operation, the elevator motor 63 starts to rotate in a reverse direction, and the cam-gear structure 67 rotates in a clockwise direction. Further, the elevator lever structure 68 rotates in a clockwise direction to the original position indicated by the two-dot chain line in FIG. 3. Accordingly, the pantograph mechanism 75 changes state from a state shown in FIG. 5 to a state shown in FIG. 6. The elevator plate 76 is lowered, and the support structure 77 is also lowered. Moreover, the disc holding mechanism 33 releases the holding operation with respect to the disc 15. Therefore, the disc 15 is lowered and placed onto the turntable 32, and is clamped by the disc clamping device 35 which will be described hereinafter. In addition, the disc 15 is rotated towards a clockwise direction shown by an arrow A together with the turntable 32, by the operation of a motor 81.

Moreover, the carriage 47 moves in the direction of the arrow Y1 from a waiting position, to reproduce the information signal by the reproducing stylus 43 which relatively scans the recording surface of the disc 15.

Next, an operation in which the disc 15 is recovered from within the reproducing apparatus 30, will now be described.

Upon completion of the reproducing operation, the carriage 47 is moved towards the direction of the arrow Y2, and returned to the original waiting position by the transferring mechanism 52. The load/eject button 60 is pushed upon insertion of the empty jacket 11 into the reproducing apparatus 30. Hence, the elevator motor 63 starts to rotate, and the cam-gear structure 67 rotates in a counter clockwise direction. Similarly as in the above described case, the support structure 77 rises to push the disc 15 upwards, and the disc 15 which is pushed up is held by the disc holding mechanism 33.

Upon recovering of the disc 15, an empty jacket 11 is again inserted into the reproducing apparatus 30 through the inserting opening 51, with the opening of the jacket 11 first. Thus, the enlarging mechanism 31 is pushed by the jacket 11 and moves in the direction of the arrow X1, to enlarge the opening of the jacket 11. As the jacket 11 is inserted towards the direction of the arrow X1, the disc 15 is relatively inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is relatively inserted within the opening of the jacket 11.

When the jacket 11 is inserted into the final position, the disc 15 is accommodated within the jacket 11, and the main part of the lid plate 12 which has been locked, is inserted inside the jacket opening. Further, the lid plate locking mechanism 34 releases the lid plate 12.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, an embodiment of a disc clamping device of a reproducing apparatus of the present invention, will be described in conjunction with FIGS. 4 through 7.

The disc clamping device 35 comprises three disc clamping fingers 91 (91a, 91b, and 91c) which are provided on a supporting ring 90. The disc clamping device 35 is in a state shown in FIGS. 4 and 5 during a non-clamping state, and in a state shown in FIG. 6 during a clamping state.

A flange 93 is fixed on a rotary shaft 92 of the motor 81 which is mounted on the chassis 48, and the turntable 32 is fixed to this flange 93. In addition, a hub 94 of a circular truncated cone shape fits over the rotary shaft 92 in a freely slidable manner. The hub 94 is urged in the upward direction by a spring 95, and makes contact with a washer 96 for preventing the hub 94 from slipping out. Cutouts 94a are formed at the periphery of the hub 94, for receiving the clamping fingers 91a through 91c and the like. The hub 94 has a pin 97 which extends downwards to fit into a hole 93a of the flange 93, and hence rotate unitarily with the flange 93.

The supporting ring 90 of the support structure 77 is fixed at the curved tip end portion 99a of three legs 99 extending upwards through cutouts 32a of the turntable 32. The lower parts of the legs 99 are fixed to a lift ring 100. Accordingly, the supporting ring 90 and the lift ring 100 are movable upwards and downwards with respect to the turntable 32, and rotate unitarily with the turntable 32. The lift ring 100 makes contact with the elevator plate 76, and is supported in a state shown in FIG. 5.

L-shaped brackets 98 for guiding a center hole 15a of the disc 15, are provided in pairs at three angular positions, where the angular relationship between adjacent pair of L-shaped brackets 98 are mutually the same. Furthermore, the disc clamping fingers 91 are provided between each pair of the brackets 98.

Figure 7:
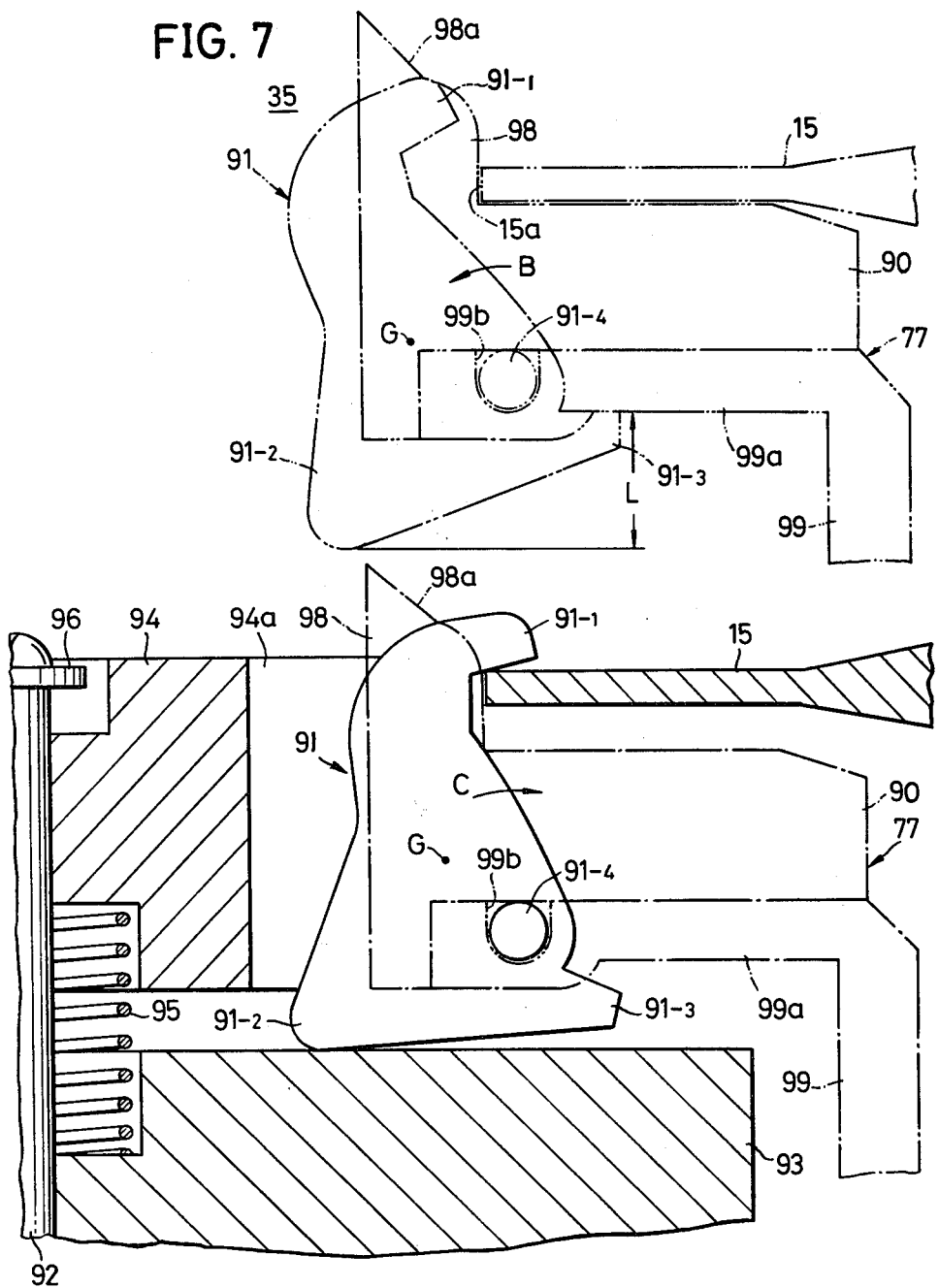
FIG. 7 is an enlarged diagram for showing the operation of clamping fingers of the clamping device.

The disc clamping fingers 91 are substantially of a triangular shape as shown in FIG. 7, and respectively have a claw part 91-1 projecting in the outer peripheral direction of the turntable 32, at the vertex part thereof.

A triangular extension 91-2 projecting towards the center side of the turntable 32 and a locking projection 91-3 projecting towards the outer peripheral direction of the turntable 32 are respectively provided in each of the disc clamping fingers 91. A point G indicates the center of gravity of the disc clamping finger 91. Moreover, a pin 91-4 is inserted into a U-shaped cutout 99b formed in the curved tip end portion 99a of the leg 99, to support the disc clamping finger 91 in a freely rotatable state.

The pin 91-4 is provided at a position deviated towards the outer peripheral direction of the turntable 32 from the center of gravity G of the disc clamping finger 91. Hence, the disc clamping fingers 91 are of a supporting construction of a deviating center of gravity type, in which a rotation moment is acting in the counter clockwise direction (direction of an arrow B) about the pin 91-4 due to the own weights of the disc clamping fingers 91.

Figure 4:
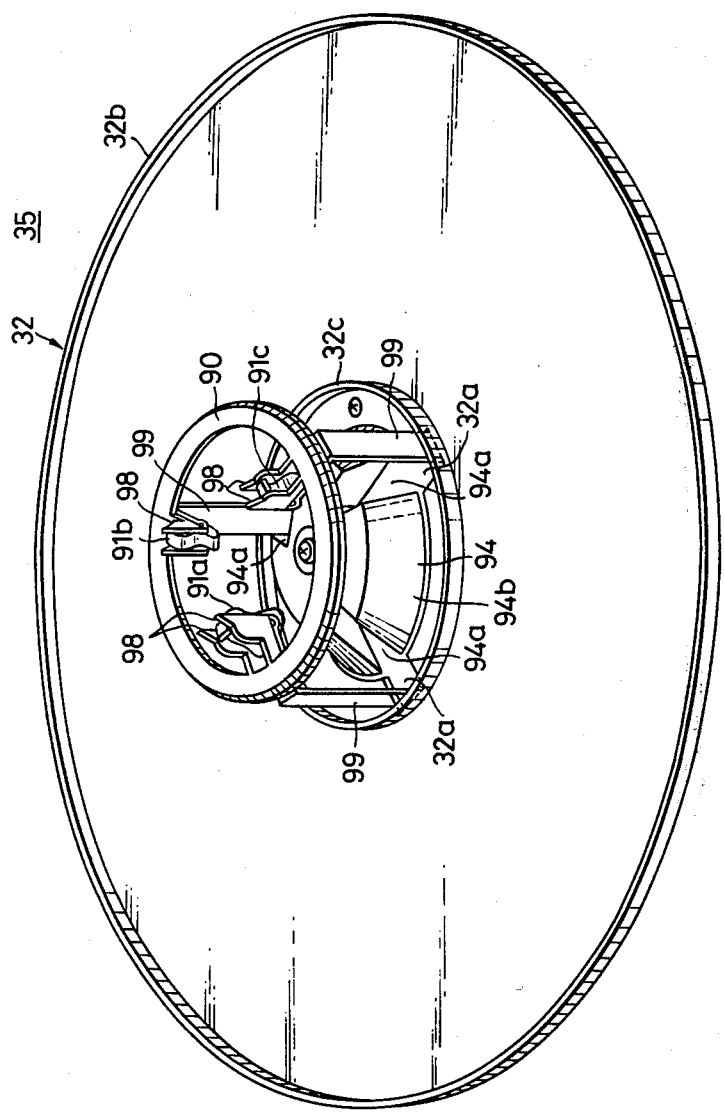
FIG. 4 is a perspective view showing an embodiment of a rotary recording medium clamping device which forms an essential part of the apparatus according to the present invention, at a raised position.
Figure 5:
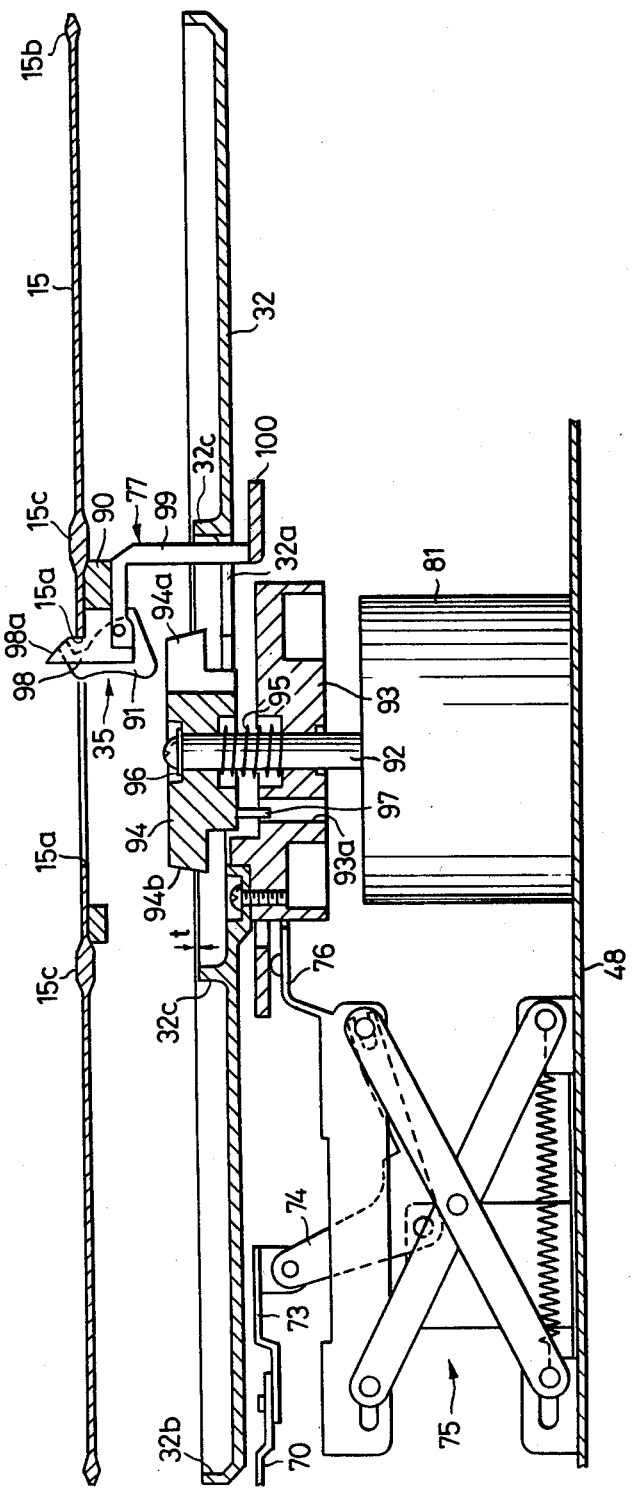
FIGS. 5 and 6 respectively are diagrams showing a non-clamping state and a clamping state of the clamping device shown in FIG. 4 in vertical cross-sections.

Therefore, when the support structure 77 is at the raised position, the disc clamping fingers 91 rotate in the direction of the arrow B due to their own weights, as shown by two-dot chain lines in FIGS. 4, 5, and 7. Hence, the locking projection 91-3 is locked by the curved tip end portion 99a, and the claw part 91-1 is receded towards the inner peripheral direction of the supporting ring 90 to be drawn in between adjacent brackets 98. On the other hand, the triangular extension 91-2 projects downward from the curved tip end portion 99a of the leg 99, by a length L. When the disc clamping finger 91 is at this rotated position, the claw part 91-1 is positioned inside a plane of projection of the center hole 15a of the disc 15.

In addition, a sloping part 98a for guiding the center hole 15a of the disc 15, is provided on each of the brackets 98.

Next, description will be given with respect to the operation of the above described mechanism.

First, when the disc case 10 is inserted into the reproducing apparatus 30 upon reproduction of the disc 15, the supporting ring 90 moves downwards, and recedes from the case inserting path as described above.

When the jacket 11 is pulled out in the direction of the arrow X2 in a state where the disc 15 is held by the disc holding mechanism 33, the supporting ring 90 moves upwards as shown in FIGS. 5 and 7. Accordingly, the brackets 98 enter within the center hole 15a of the disc 15, so that the supporting ring 90 itself supports the part of the disc 15 in the vicinity of the center hole 15a. At this point, the claw parts 91-1 of the disc clamping finger 91 are receded inside the brackets 98, and the disc clamping fingers 91 can also enter inside the center hole 15a of the disc 15 without being interferred.

Even when some deviation in position exist with respect to the position of the disc 15 upon pulling out of the jacket 11, the center hole 15a of the disc 15 is guided by the sloping surfaces 98a of the brackets 98. Therefore, the position of the disc 15 is corrected into a predetermined position, and supported on top of the turntable 32 in this state in which the position of the disc 15 is corrected. Furthermore, the clamping fingers 91 (91a, 91b, and 91c) are respectively rotated in the direction of the arrow B, and the clamping fingers 91 (91a, 91b, and 91c) respectively enter within the center hole 15a without striking against the disc 15.

Figure 6:
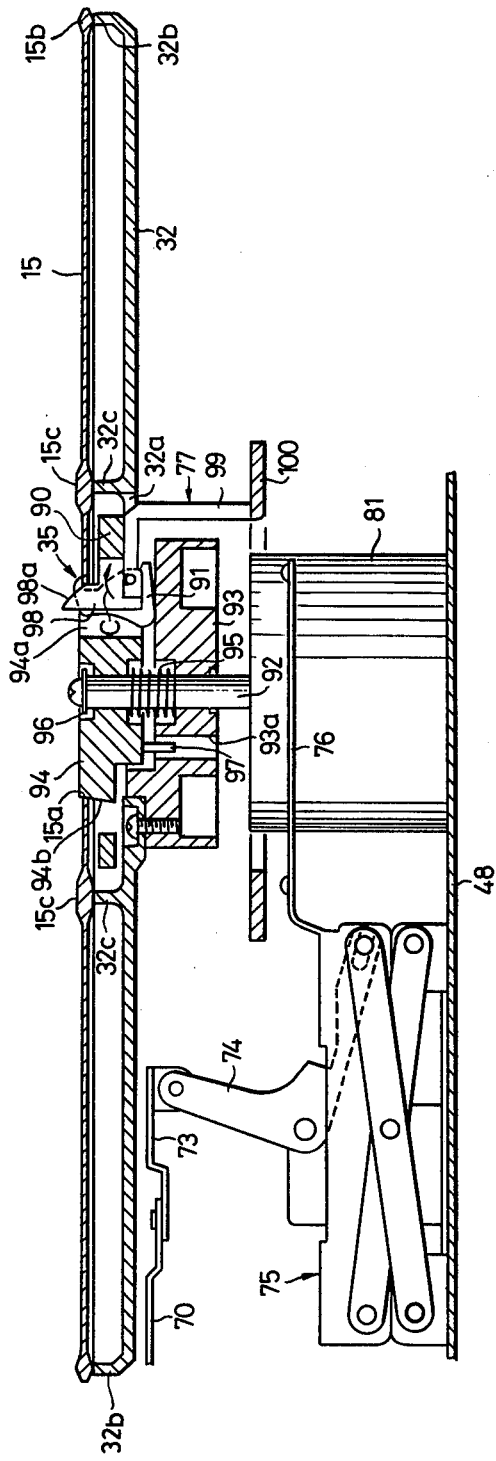

When the play operation is initiated after the jacket 11 is pulled out, the holding of the disc 15 by the holding mechanism 33 is released, as described above. Moreover, the support structure 77 moves downwards, and the disc 15 is placed on the turntable 32 and clamped as shown in FIGS. 6 and 7.

When the support structure 77 moves downwards to a predetermined height position, the disc 15 separates from the supporting ring 90. Thus, an outer peripheral groove guard 15b of the disc 15 is supported by an outermost peripheral projecting rim 32b of the turntable 32, and an inner peripheral groove guard 15c of the disc 15 is supported by a central projecting rim 32c of the turntable 32.

The disc clamping device 35 is operated in response to the lowering of the support structure 77. Due to the lowering of the support structure 77, the brackets 98 and the disc clamping fingers 91 respectively enter into the cutouts 94a of the hub 94, and respectively move downwards. On the other hand, the triangular extensions 91-2 of the disc clamping fingers 91 which are rotated towards a clamping releasing direction, make contact with the upper surface of the flange 93. When the support structure 77 is further lowered, the disc clamping fingers 91 rotate in a clockwise direction indicated by an arrow C in FIGS. 6 and 7 (clamping direction). Accordingly, the claw parts 91-1 move toward the outer peripheral direction from the brackets 98, to project from the upper surface of the disc 15 at a part in the vicinity of the center hole 15a and clamp the disc 15.

When the disc clamping fingers 91 rotate to perform the disc clamping operation, the triangular extensions 91-2 move by slightly sliding against the upper surface of the flange 93. Therefore, the shape of the triangular extensions 91-2 are rounded, in order to smoothly slide against the flange 93.

The support structure 77 moves down to a final position indicated by one-dot chain lines in FIGS. 6 and 7. That is, the elevator plate 76 is positioned at a lower side separated from the lift ring 100, and the curved tip end portions 99a are at positions separated and not making contact with the flange 93. Hence, a rotational force to urge the disc clamping fingers 91 towards a disc clamping direction, is applied due to the total weight of the support structure 77 as a relatively large rotational force. Thus, the inner peripheral groove guard 15c of the disc 15 is pressed against the central projecting rim 32c of the turntable 32 with a considerable force, to positively clamp the disc 15 on the turntable 32. The disc 15 is accordingly clamped at three positions lying on lines which divide the turntable 32 into three equal angular parts.

The center hole 15a of the disc 15 makes contact with a conical surface 94b of the hub 94, at a stage before the clamping fingers 91a through 91c operate. Accordingly, the hub 94 is pushed slightly downwards by the disc 15 against a force exerted by the spring 95, and the hub 94 pushes against the center hole 15a of the disc 15 due to the action of the spring 95. Therefore, the center position of the disc 15 is automatically aligned with the center of the turntable 32 by the hub 94, and the disc 15 is accordingly clamped on the turntable 32 in this state.

When the peripheral part of the disc 15 is warped upwards, the inner peripheral groove guard 15c of the disc 15 makes contact with the central projecting rim 32c. Thus, no suction of air is introduced, and the outer peripheral part of the disc 15 makes contact with the turntable 32 due to the action of a negative pressure introduced at a space between the disc 15 and the turntable 32 upon high-speed rotation of the turntable 32. However, when the peripheral part of the disc 15 is warped downwards, the inner peripheral groove guard 15c of the disc 15 does not make contact with the central projecting rim 32c, that is, a space is formed between the inner peripheral groove guard 15c and the central projecting rim 32c of the turntable 32. Since an air passage is formed due to this space between the inner peripheral groove guard 15c and the central projecting rim 32c, the above described negative pressure is not easily introduced, and the warp in the disc 15 cannot be corrected. However, by operating a clamping force in the vicinity of the center hole 15a of the disc 15, the warp in the disc 15 can be corrected even when the peripheral part of the disc 15 is warped downwards. Accordingly, the inner peripheral groove guard 15c of the disc 15 makes contact with the central projecting rim 32c, and a negative pressure can effectively be introduced upon high-speed rotation of the turntable 32. Moreover, the disc 15 is rotated in a state where the disc 15 is rigidly placed on the turntable 32, due to the clamping force exerted by the disc clamping fingers 91a, 91b, and 91c and the negative pressure.

By performing an operation to finish reproduction, the support structure 77 rises as described above. The triangular extensions 91-2 of the disc clamping fingers 91 separate from the flange 93, and the disc clamping fingers 91 rotationally return to the original positions indicated by two-dot chain lines in FIGS. 5 and 7 by rotating in the direction of the arrow B, due to their own rotation moment. Further, the claw parts 91-1 of the disc clamping fingers 91 separate from the disc 15, to release the clamping operation with respect to the disc 15.

Upon reproduction of the disc 15, no slippage is introduced between the disc 15 and the turntable 32 when starting a high-speed rotation of the turntable 32, since the disc 15 is clamped by the above clamping fingers 91a, 91b, and 91c. Moreover, since the clamping fingers 91 are made of metal, the static electricity of the disc 15 is grounded through the clamping fingers 91, the flange 93, and the like, when the disc 15 is clamped by the clamping fingers 91. The lift ring 100 rotates together with the turntable 32 in a state where the lift ring 100 is separated from the elevator plate 76.

The above described disc clamping device 35 can be constructed without requiring spring members for rotating the disc clamping fingers 91 towards a clamping releasing direction, and permanent magnet pieces for applying a rotational force in a direction so as to perform a clamping operation, and the like. Accordingly, the number of parts required for the apparatus can be reduced. Moreover, the construction of the apparatus can be simplified, and the cost and the size of the apparatus can be reduced.

Considering the inconsistency in the thickness of the discs, the turntable 32 is constructed so that the upper surface of the outermost peripheral projecting rim 32b is higher than the upper surface of the central projecting rim 32c by a predetermined value t (0.2 milimeters, for example) as shown in FIG. 5. Accordingly, a difference in height exists between the height of the outermost peripheral projecting rim 32b and the central projecting rim 32c.

When the rims 32b and 32c of the turntable 32 are formed so that the upper surfaces of the rims 32b and 32c lie on the same plane, in a case where a disc having an outer peripheral groove guard 15b whose thickness is thinner than the thickness of the inner peripheral groove guard 15c due to inconsistency introduced upon manufacturing of the disc is to be reproduced, the disc is placed onto the turntable 32 in a state where the outer peripheral groove guard 15b is slightly separated from the corresponding rim 32b. In this state, the outer peripheral part of the disc becomes unstable upon rotation, and reproduction becomes impossible due to the undulant state of the recording surface of the disc.

Accordingly, by introducing a slight difference in the heights of the outermost projecting rim 32b and the central projecting rim 32c as described above, any disc can be placed onto the turntable 32 in a state where the outer peripheral groove 15b of the disc is always making contact with the corresponding outermost peripheral projecting rim 32b of the turntable 32. With respect to the inner peripheral groove guard 15c, the groove guard 15c is pushed by the above disc clamping device 35 and makes contact with the corresponding central projecting rim 32c. Hence, even when the thickness of the groove guards of the disc differ, the groove guards are positively pushed against the corresponding rims of the turntable, and the disc can be rotated positively together with the turntable.

Further, this invention is not limited to these embodiments but various variations and modifications may be made without departing from the scope of the invention.

What is claimed is:

1. A rotary recording medium reproducing apparatus comprising a turntable onto which a rotary recording medium is placed, a motor for rotating said turntable, a reproducing transducer for reproducing a recorded signal from the rotary recording medium placed onto said turntable, and a clamping mechanism for clamping said rotary recording medium on said turntable, said clamping device comprising:
   a support structure capable of unitarily rotating with said turntable and moving up and down independently of said turntable, for supporting said rotary recording medium in the vicinity of a center hole of the rotary recording medium when said support structure is in a raised position;
   an elevating mechanism for moving said support structure upwards and downwards;
   clamping fingers provided on said support structure for clamping said rotary recording medium on said turntable in the vicinity of the center hole of said rotary recording medium when said clamping fingers are operated, said clamping fingers being pivotally supported at positions deviated from their centers of gravity so as to rotate towards a clamping releasing direction; and
   a receiving and stopping member for rotating said clamping fingers towards a clamping direction opposite to the clamping releasing direction by receiving and stopping parts of said clamping fingers when said support structure is lowered,
   said support structure being separated from both said elevating mechanism and said receiving and stopping member when said support structure is lowered,
   said clamping fingers being applied with a rotational force in the clamping direction due to the weight of said support structure, to press the part of the rotary recording medium in the vicinity of the center hole thereof against said turntable.

2. A rotary recording medium reproducing apparatus as claimed in claim 1 in which said support structure has a support ring provided at a vertex part thereof, said clamping fingers respectively have a shape consisting of a claw part provided at a vertex part thereof, an extension provided on one side of the lower portion thereof, and a locking projection provided on the other side of the lower portion thereof, and respectively are axially supported at a position deviated towards the side of said locking projection from the center of gravity of said clamping finger, and in a non-operation state of said clamping fingers, said locking projection is at a rotated position where said locking projection is locked by a part of said support structure, said claw part is positioned inside a projection plane of the center hole of said rotary recording medium, and said extension projects downwards from said support ring.

3. A rotary recording medium reproducing apparatus as claimed in claim 2 in which said extension of said clamping finger is shaped such that the tip end part of said extension is of a rounded shape.

4. A rotary recording medium reproducing apparatus as claimed in claim 2 in which said extension of said clamping finger is of a rounded triangular shape at the tip end thereof.

5. A rotary recording medium reproducing apparatus as claimed in claim 1 in which said receiving and stopping member is a flange fixed to a rotary shaft of said turntable.

6. A rotary recording medium reproducing apparatus as claimed in claim 1 in which said support structure has a guide part for correcting the position of said rotary recording medium directly above said turntable by entering into the center hole of said rotary recording medium when said support structure is raised.

7. A rotary recording medium reproducing apparatus as claimed in claim 1 which further comprises a hub member provided at the rotary shaft of said turntable, for entering into the center hole of the rotary recording medium placed onto said turntable.

8. A rotary recording medium reproducing apparatus as claimed in claim 6 in which said hub member has a cutout for receiving said clamping finger and said guide part when said support structure is lowered.

9. A rotary recording medium reproducing apparatus as claimed in claim 7 in which said hub member is of a truncated conical shape at a part which enters into the center hole of said rotary recording medium.

10. A rotary recording medium reproducing apparatus as claimed in claimed in claim 1 in which said rotary recording medium is of a shape having an outer peripheral groove guard and an inner peripheral groove guard, said turntable has a projecting rim for receiving said outer peripheral groove guard and a projecting rim for receiving said inner peripheral groove guard, and said projecting rims are provided so that a difference in height exists between their upper surfaces.

* * * * *